United States Patent [19]
Hill et al.

[11] Patent Number: 5,805,977
[45] Date of Patent: Sep. 8, 1998

[54] METHOD AND APPARATUS FOR CONTROLLING TRANSMISSIONS IN A TWO-WAY SELECTIVE CALL COMMUNICATION SYSTEM

[75] Inventors: Thomas Casey Hill, Wellington; Thomas V. D'Amico, Boca Raton; Robert John Schwendeman, Pompano Beach, all of Fla.

[73] Assignee: Motorola, Inc., Schaumburg, Ill.

[21] Appl. No.: 617,699

[22] Filed: Apr. 1, 1996

[51] Int. Cl.⁶ .............. H04Q 7/12; H04Q 7/08; H04Q 7/36

[52] U.S. Cl. .......... 455/31.3; 455/38.1; 455/447; 455/450; 455/63

[58] Field of Search ................ 455/446, 447, 455/31.3, 450, 452, 509, 454, 62, 63, 38.1; 371/32, 33; 370/329, 461, 462

[56] References Cited

U.S. PATENT DOCUMENTS

| | | |
|---|---|---|
| 4,875,038 | 10/1989 | Siwiak et al. . |
| 5,428,818 | 6/1995 | Meidan et al. ............ 455/447 |
| 5,711,007 | 1/1998 | Lin et al. ................ 455/447 |

*Primary Examiner*—Wellington Chin
*Assistant Examiner*—Keith Ferguson
*Attorney, Agent, or Firm*—R. Louis Breeden

[57] ABSTRACT

A two-way selective call communication system (FIG. 1) controls transmissions in a dominant cell (504) of a plurality of cells (502, 504) utilizing a common radio frequency for sending messages (408). The dominant cell carries significantly greater traffic than any other cell of the plurality of cells. A controller (112) groups (808, 906), into a first time period (708), the transmissions of non-dominant cell messages which interfere with the transmissions of dominant cell messages. The controller then determines a subset of the dominant cell messages that require a higher signal-to-interference ratio than available in the dominant cell during the first time period. The controller then transmits (908) the subset during a second time period (710) different from the first time period.

15 Claims, 7 Drawing Sheets

METHOD AND APPARATUS FOR CONTROLLING TRANSMISSIONS IN A TWO-WAY SELECTIVE CALL COMMUNICATION SYSTEM

RELATED APPLICATION

U.S. patent application No. 08/588,502 filed Jan. 18, 1996 by Hill et al., entitled "Method and Apparatus for Transmitting an Outbound Message in a Two-Way Messaging System."

FIELD OF THE INVENTION

This invention relates in general to communication systems, and more specifically to a method and apparatus for controlling transmissions in a two-way selective call communication system.

BACKGROUND OF THE INVENTION

Two-way selective call communication systems have employed frequency reuse to greatly increase traffic capacity. Such systems have been divided into a plurality of geographically defined cells and have operated to identify the cell in which a portable subscriber unit is located before sending a message to the portable subscriber unit. Then the systems have assigned a frequency and a time for transmitting the message. The same frequency has been reused in other cells at the same time.

Such systems generally have been designed with fixed frequency reuse plans which have provided some degree of protection against co-channel interference. Unfortunately, however, these systems have queued messages for transmission as the messages have been received by the system, without regard to the levels of interference some of the messages could cause to other messages. As a result, interference sometimes has blocked the receipt of a portion of the messages.

Thus, what is needed is a method and apparatus for controlling transmissions in a two-way selective call communication system in a manner that will reduce interference among the messages.

SUMMARY OF THE INVENTION

An aspect of the present invention is a method in a two-way selective call communication system for controlling transmissions in a dominant cell of a plurality of cells utilizing a common radio frequency for sending messages. The dominant cell carries significantly greater traffic than any other cell of the plurality of cells. The method comprises the steps of grouping, into a first time period, the transmissions of non-dominant cell messages which interfere with the transmissions of dominant cell messages; and determining a subset of the dominant cell messages that require a higher signal-to-interference ratio than available in the dominant cell during the first time period. The method further comprises the step of transmitting the subset during a second time period different from the first time period.

Another aspect of the present invention is an apparatus in a two-way selective call communication system for controlling transmissions in a dominant cell of a plurality of cells utilizing a common radio frequency for sending messages. The dominant cell carries significantly greater traffic than any other cell of the plurality of cells. The apparatus comprises elements for grouping, into a first time period, the transmissions of non-dominant cell messages which interfere with the transmissions of dominant cell messages; and elements, coupled to the elements for grouping, for determining a subset of the dominant cell messages that require a higher signal-to-interference ratio than available in the dominant cell during the first time period. The apparatus further comprises a transmitter, coupled to the elements for determining, for transmitting the subset during a second time period different from the first time period.

Another aspect of the present invention is a controller in a two-way selective call communication system for controlling transmissions in a dominant cell of a plurality of cells utilizing a common radio frequency for sending messages. The dominant cell carries significantly greater traffic than any other cell of the plurality of cells. The controller comprises a telephone interface for receiving the messages from a telephone network, and a processing system coupled to the telephone interface for grouping the messages such that the transmissions of non-dominant cell messages which interfere with the transmissions of dominant cell messages are grouped into a first time period. The controller further comprises a receiver interface coupled to the processing system for cooperating with the processing system to determine a subset of the dominant cell messages that require a higher signal-to-interference ratio than available in the dominant cell during the first time period, and a transmitter interface coupled to the processing system for transmitting the subset during a second time period different from the first time period.

DESCRIPTION OF THE PREFERRED EMBODIMENT

Figure 1:
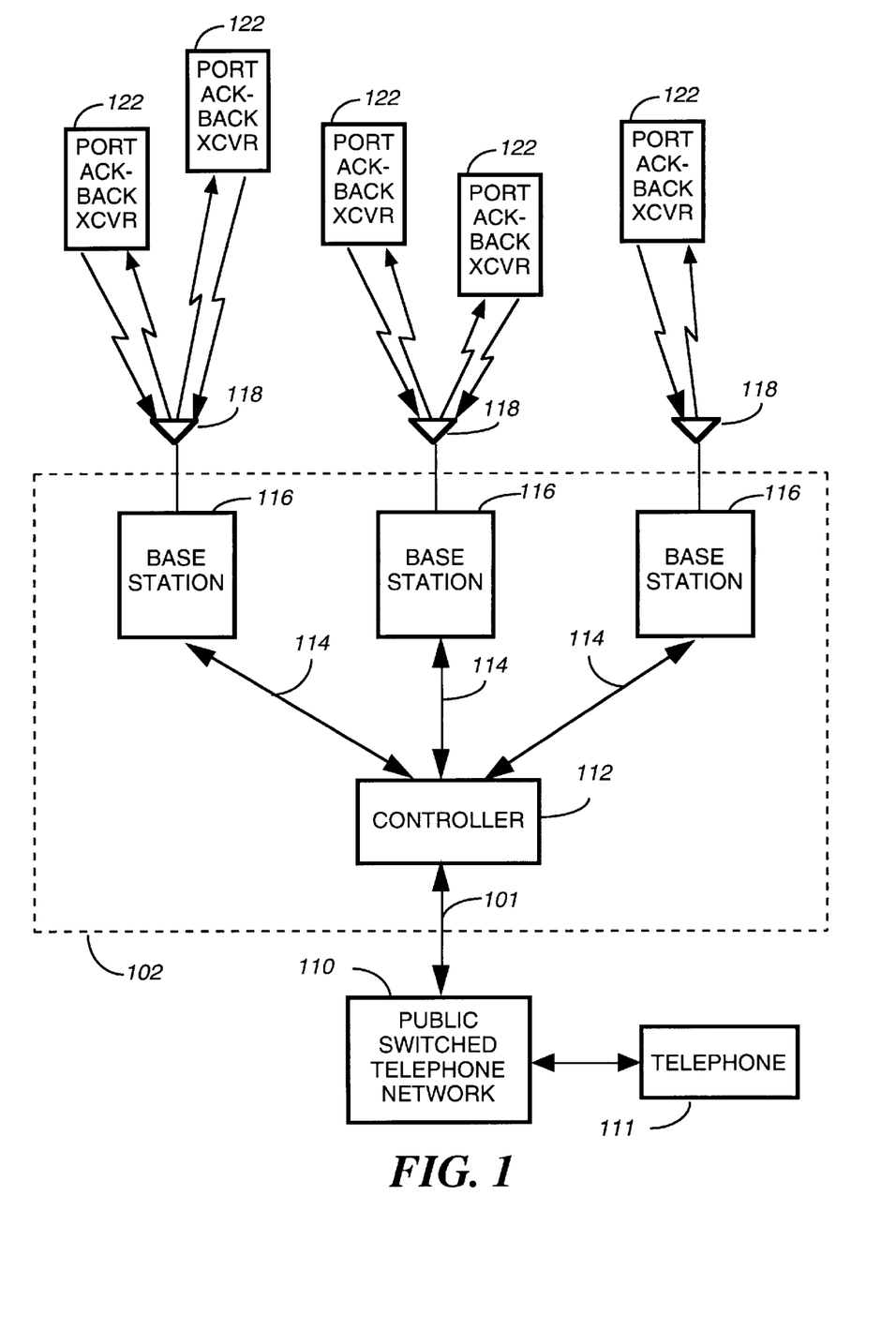
FIG. 1 is an electrical block diagram of a two-way selective call communication system in accordance with the present invention.

Referring to FIG. 1, an electrical block diagram of a two-way selective call communication system in accordance with the present invention comprises a fixed portion 102 including a controller 112 and a plurality of base stations 116, and a portable portion including a plurality of portable acknowledge-back transceivers 122. The base stations 116 are used for communicating with the portable acknowledge-back transceivers 122 utilizing conventional radio frequency (RF) techniques, and are coupled by communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The hardware of the base stations 116 is preferably a combination of the Nucleus® Orchestra! transmitter and RF-Audience!™ receivers manufactured by Motorola, Inc. It will be appreciated that other similar hardware can be utilized for the controller 112 and the base stations 116.

Each of the base stations 116 transmits RF signals to the portable acknowledge-back transceivers 122 via a transceiver antenna 118. The base stations 116 each receive RF signals from the plurality of portable acknowledge-back transceivers 122 via the transceiver antenna 118. The RF signals transmitted by the base stations 116 to the portable acknowledge-back transceivers 122 (outbound messages) comprise selective call addresses identifying the portable acknowledge-back transceivers 122, and data or voice messages originated by a caller. The RF signals transmitted by the portable acknowledge-back transceivers 122 to the base stations 116 (inbound messages) comprise responses that include positive acknowledgments (ACKs), negative acknowledgments (NAKs), and portable acknowledge-back transceiver 122 received signal quality indications in accordance with the present invention, as will be described below.

Inbound acknowledge-back messaging is more fully described in U.S. Pat. No. 4,875,038 issued Oct. 17, 1989 to Siwiak et al., which patent is hereby incorporated herein by reference.

The controller 112 preferably is coupled by telephone links 101 to a public switched telephone network (PSTN) 110 for receiving selective call originations therefrom. Selective call originations comprising voice and data messages from the PSTN 110 can be generated, for example, from a conventional telephone 111 coupled to the PSTN 110.

The protocol utilized for outbound and inbound messages is preferably similar to Motorola's well-known InFLEXion™ digital selective call signaling protocol. This protocol utilizes well-known error detection and error correction techniques and is therefore tolerant to bit errors occurring during transmission, provided that the bit errors are not too numerous in any one code word. It will be appreciated that other suitable two-way protocols such as, for example, ReFLEX™ can be used as well.

Figure 2:
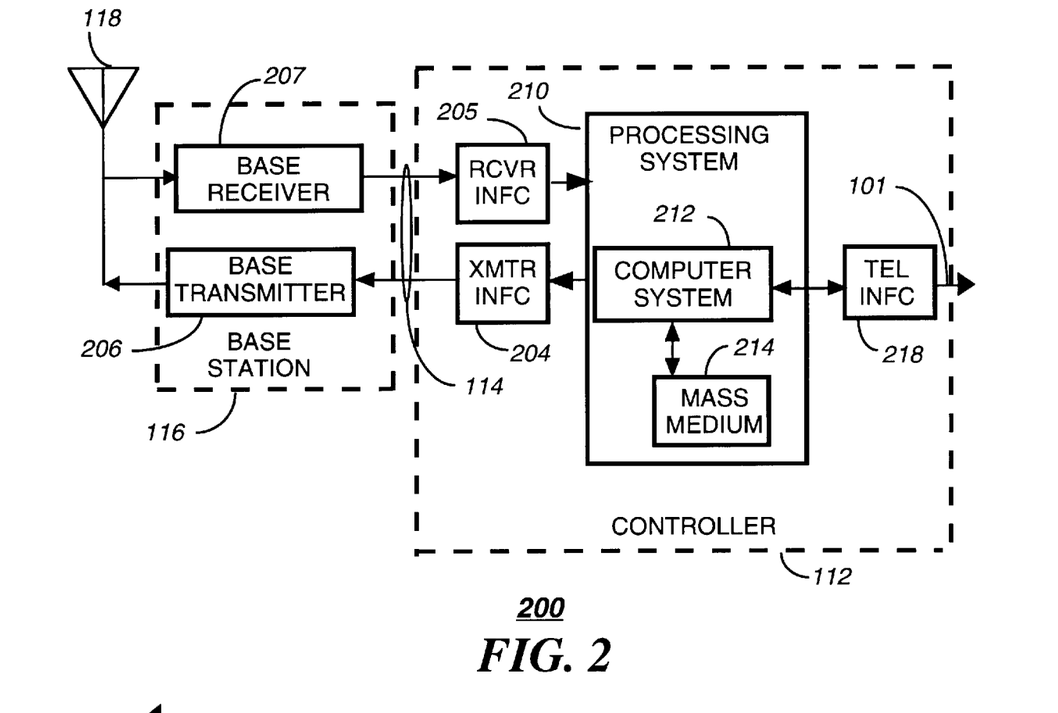
FIG. 2 is an electrical block diagram of a controller and a base station in accordance with the present invention.

FIG. 2 is an electrical block diagram 200 of the controller 112 and the base station 116 in accordance with the preferred embodiment of the present invention. The controller 112 includes a processing system 210, a transmitter interface 204, a receiver interface 205, and a telephone interface 218. The base station 116 includes a base transmitter 206 and at least one base receiver 207.

The processing system 210 is used for directing operation of the controller 112. The processing system 210 preferably is coupled through the transmitter interface 204 to the base transmitter 206 via the communication link 114. The processing system 210 preferably also is coupled through the receiver interface 205 to the base receiver 207 via the communication link 114. The communication link 114 utilizes, for example, conventional means such as a direct wire line (telephone) link, a data communication link, or any number of radio frequency links, such as a radio frequency (RF) transceiver link, a microwave transceiver link, or a satellite link, just to mention a few. The processing system 210 is also coupled to the telephone interface 218 for accepting the outbound message originated by a user communicating with the PSTN 110 through the telephone links 101.

In order to perform the functions necessary for controlling the elements of the controller 112, as well as the elements of the base stations 116, the processing system 210 preferably includes a conventional computer system 212, and a conventional mass storage medium 214. The conventional mass storage medium 214 includes, for example, subscriber user information such as addressing and programming options of the portable acknowledge-back transceiver 122.

The conventional computer system 212 is preferably programmed by way of software included in the conventional mass storage medium 214 for performing the operations and features required in accordance with the present invention. The conventional computer system 212 preferably comprises a plurality of processors such as VME Sparc™ processors manufactured by Sun Microsystems, Inc. These processors include memory such as dynamic random access memory (DRAM), which serves as a temporary memory storage device for program execution, and scratch pad processing such as, for example, storing and queuing messages originated by callers using the PSTN 110, processing acknowledgments received from the portable acknowledge-back transceivers 122, and protocol processing of messages destined for the portable acknowledge-back transceivers 122, just to mention a few. The conventional mass storage medium 214 is preferably a conventional hard disk mass storage device.

It will be appreciated that other types of conventional computer systems 212 can be utilized, and that additional computer systems 212 and mass storage media 214 of the same or alternative type can be added as required to handle the processing requirements of the processing system 210. It will be further appreciated that additional base receivers 207 either remote from or collocated with the base transmitter 206 can be utilized to achieve a desired inbound sensitivity, and that additional, separate antennas 118 can be utilized for the base transmitter 206 and the base receivers 207.

Figure 3:
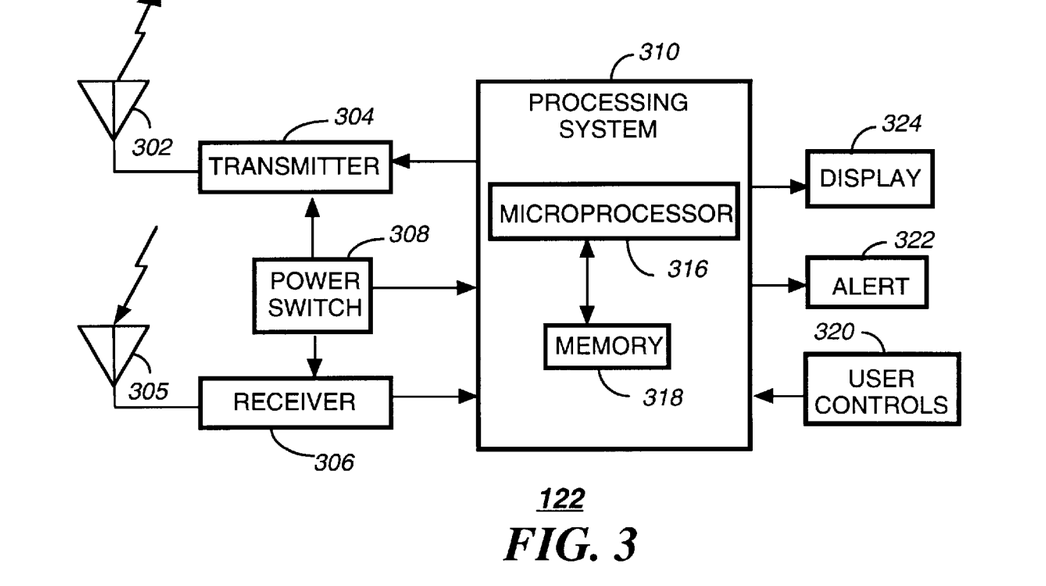
FIG. 3 is an electrical block diagram of an acknowledge-back transceiver in accordance with the present invention.

FIG. 3 is an electrical block diagram of a portable acknowledge-back transceiver 122 according to the present invention. The portable acknowledge-back transceiver 122 comprises a transmitter antenna 302 for transmitting RF signals to the base stations 116, and a receiver antenna 305 for intercepting RF signals from the base stations 116. The transmitter antenna 302 is coupled to a conventional RF transmitter 304. Similarly, the receiver antenna 305 is coupled to a conventional RF receiver 306. It will be appreciated that, alternatively, the receiver 306 and transmitter 304 can be coupled to a single transceiver antenna, which transmits and intercepts RF signals to and from the base stations 116.

Radio signals received by the RF receiver 306 produce demodulated information at the output. The demodulated information is coupled to the input of a processing system 310 for directing operations of the portable acknowledge-back transceiver 122, and for processing outbound messages. Similarly, inbound messages are processed by the processing system 310 and delivered to the RF transmitter 304 for transmission to the base stations 116. A conventional power switch 308, coupled to the processing system 310, controls the supply of power to the RF transmitter 304 and RF receiver 306, thereby providing a battery saving function.

To perform the necessary functions of the portable acknowledge-back transceiver 122, the processing system 310 includes a microprocessor 316, and a memory 318. The microprocessor 316 is, for example, embodied by the M68HC08 micro-controller manufactured by Motorola, Inc.

The memory 318 preferably includes a conventional read-only memory (ROM) and a conventional random-access memory (RAM).

The microprocessor 316 is programmed by way of the memory 318 to process received outbound messages, and in response thereto to create and format inbound messages. During outbound message processing, the microprocessor 316 samples the demodulated signal generated by the RF receiver 306. The microprocessor 316 then decodes an address in the demodulated data of the outbound message, compares the decoded address with one or more addresses stored in the memory 318, and when a match is detected, proceeds to read the transmitter color code received in the outbound message. The microprocessor 316 then preferably stores the transmitter color code in the memory 318 for maintaining a record of N most recently received transmitter color codes, N being a predetermined integer value.

Once the microprocessor 316 has processed the message, if the message was received without more errors than the microprocessor 316 can correct according to the protocol, then the microprocessor 316 transmits an acknowledgment (ACK) signal to the fixed portion 102. The microprocessor 310 then stores the message in the memory 318, and generates a call alerting signal to alert a user that a message has been received. The call alerting signal is directed to a conventional audible or tactile call alerting device 322 for generating an audible or tactile call alerting signal. On the other hand, if the message was received with more errors than the microprocessor 316 can correct according to the protocol, then the microprocessor 316 transmits a negative acknowledgment (NAK) signal to the fixed portion 102, so that the fixed portion 102 can resend the message.

By the use of appropriate functions provided by the user controls 320, the outbound message is recovered from the memory 318, and displayed on a display 324, e.g., a conventional liquid crystal display (LCD). Alternatively, when the message is a voice message, the message is played out on a conventional audio circuit (not shown in FIG. 3) that is included in the portable acknowledge-back transceiver 122. Preferably, the portable acknowledge-back transceiver 122 utilizes components similar to those of the Tenor™ and Tango™ personal messaging units manufactured by Motorola, Inc. of Schaumburg Ill. It will be appreciated that other similar components can be utilized as well for the portable acknowledge-back transceiver 122.

Figure 4:
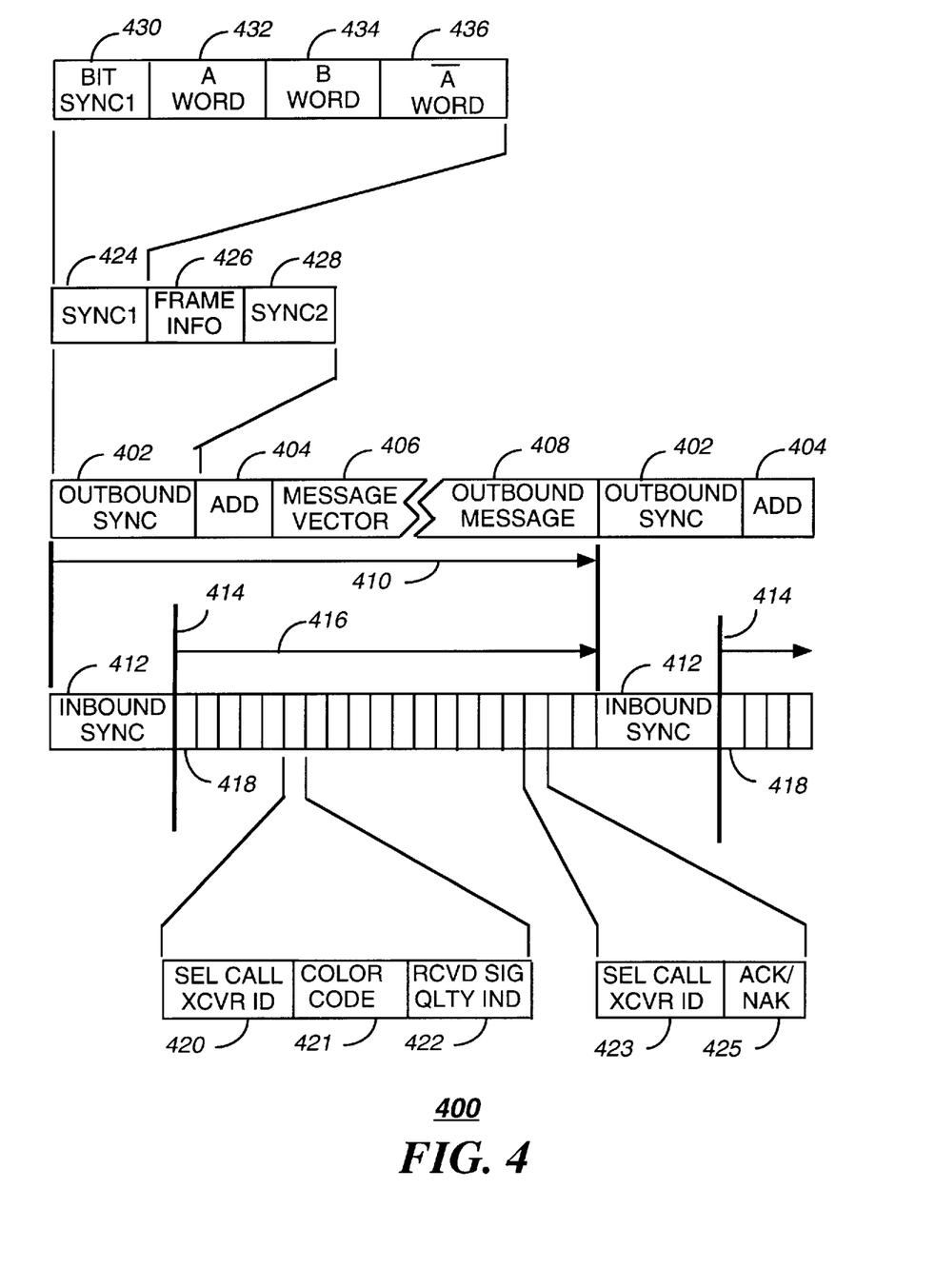
FIG. 4 is a timing diagram of a communication protocol utilized by the two-way communication system in accordance with the present invention.

FIG. 4 is a timing diagram of a communication protocol utilized by the two-way communication system in accordance with the present invention. The signaling format operating on the outbound and inbound channels preferably operates on independent frequencies utilizing conventional frequency division multiplexing (FDM). Using FDM transmission, both outbound and inbound RF channel transmissions are depicted during a time interval 410.

The elements of one transmission frame of the outbound protocol comprise an outbound sync 402, a selective call address 404, a message vector 406, and an outbound message 408. The outbound sync 402 includes a sync1 field 424, a frame information field 426, and a sync2 field 428. The sync1 field 424 comprises a bit sync1 field 430, an A word 432, a B word 434, and an inverted A word 436. The bit sync1 field 430 provides the portable acknowledge-back transceiver 122 a means for synchronization utilizing techniques well known in the art. The A word 432 identifies the protocol version used, that is, FLEX™, InFLEXion™, or ReFLEX™. The B word 434 preferably comprises one of one-hundred twenty-eight possible sixteen-bit color codes corresponding to a transmitter of the base stations 116. The consistency of transmitter color code reception preferably is utilized by the portable acknowledge-back transceiver 122 to determine a received signal quality indication in accordance with the protocol standards, as will be described below. The inverted A word 436 is used as redundant information for further verification of the integrity of the control channel information.

The selective call address 404 identifies the portable acknowledge-back transceiver 122 for which the outbound message 408 is intended. The message vector 406 points in time within the signal format to the position of the outbound message 408 to be received by the portable acknowledge-back transceiver 122, and specifies a radio frequency for receiving the message. The message vector 406 further provides information to the portable acknowledge-back transceiver 122 identifying a scheduled time slot for acknowledging the message transaction. Preferably, the outbound protocol periodically transmits a plurality, e.g., 128, of the frames 402–408 to form a periodic synchronous transmission cycle.

The elements of the inbound protocol comprise an inbound sync 412, and scheduled time slots 418. The inbound sync 412 provides the base stations 116 a means for synchronization utilizing techniques well known in the art. Scheduled messages commence after the inbound sync 412 at a time boundary 414. A transmission time interval 416 depicts the time interval for scheduled transmissions on scheduled time slots 418 from the portable acknowledge-back transceivers 122. One type of scheduled inbound message preferably comprises a selective call transceiver identification number 420, a color code 421, and a received signal quality indication 422. The selective call transceiver identification number 420 is preferably the address of the portable acknowledge-back transceiver 122. The color code 421 is the color code received most reliably by the portable acknowledge-back transceiver 122. The received signal quality indication 422 preferably is a value determined from the consistency of reception of the color code 421 by the portable acknowledge-back transceiver 122. It will be appreciated that, alternatively, other methods, e.g., a received signal strength measurement, can be utilized to determine signal quality.

Another type of scheduled inbound message comprises a selective call transceiver identification number 423 and either an ACK or a NAK. This type of inbound message is used to inform the fixed portion 102 whether or not the portable acknowledge-back transceiver 122 has received the outbound message 408 with a sufficiently low error rate to allow the processing system 310 to correct the received errors in accordance with the error correction capabilities of the protocol.

Figure 5:
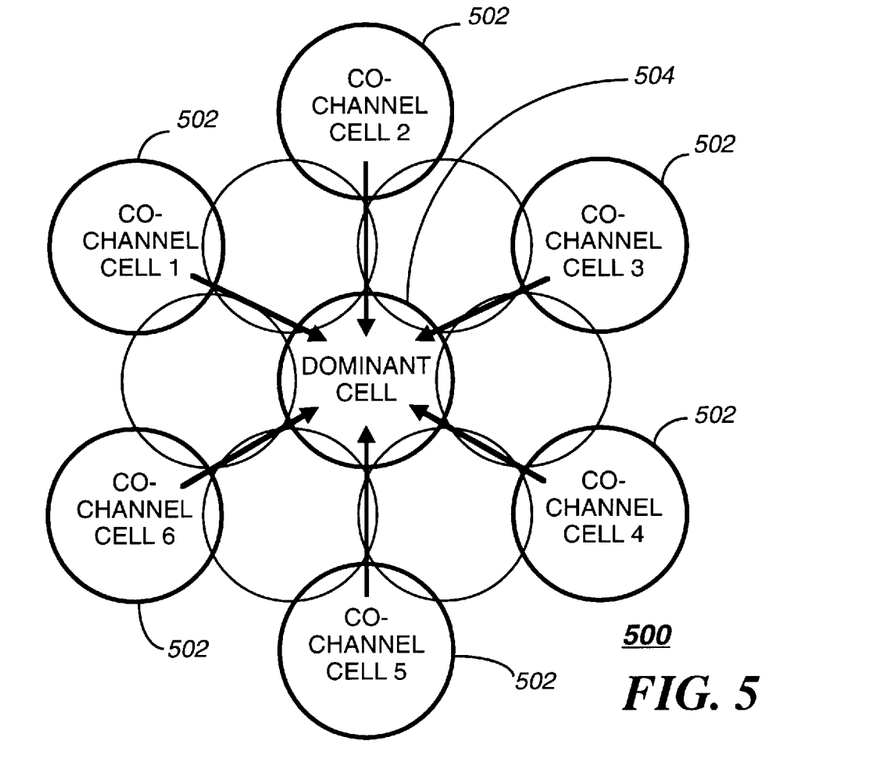
FIG. 5 depicts a seven-cell frequency reuse pattern having co-channel cells generating interference at a dominant cell.

FIG. 5 depicts a frequency reuse pattern 500 having non-dominant co-channel cells 502 generating interference at a dominant cell 504. The dominant cell 504 is defined as the cell that is carrying significantly greater traffic than any other co-channel cells in the pattern 500 at the current time. In FIG. 5 the dominant cell 504 is depicted as a centrally located cell that receives interference from six peripheral co-channel cells 502. In prior art systems the non-dominant co-channel cells 502 turn on and off during random portions of the transmission cycle, as depicted in FIG. 6.

Figure 6:
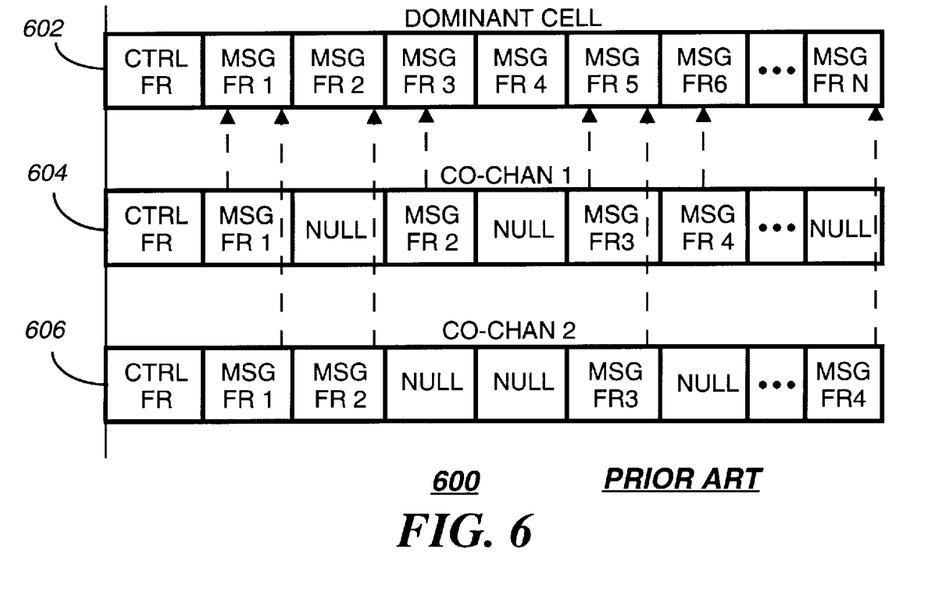
FIG. 6 is a prior art transmission timing diagram.

FIG. 6 is a prior art transmission timing diagram 600. The diagram 600 includes a periodic synchronous transmission cycle 602 for the dominant cell 504, as well as periodic synchronous transmission cycles 604, 606 for two of the non-dominant co-channel cells 502. Note that the message frames of the cells 502, 504 are synchronous with one another. Note also that the message frames 1-N are all filled in the dominant transmission cycle 602, while some of the message frames are empty (NULL) in the lower traffic, co-channel transmission cycles 604, 606. The result of the randomness of transmissions in the non-dominant co-channel cells 502 is that interference is generated in the dominant cell 504 during almost every message frame, as depicted by the arrows in the diagram 600.

Figure 7:
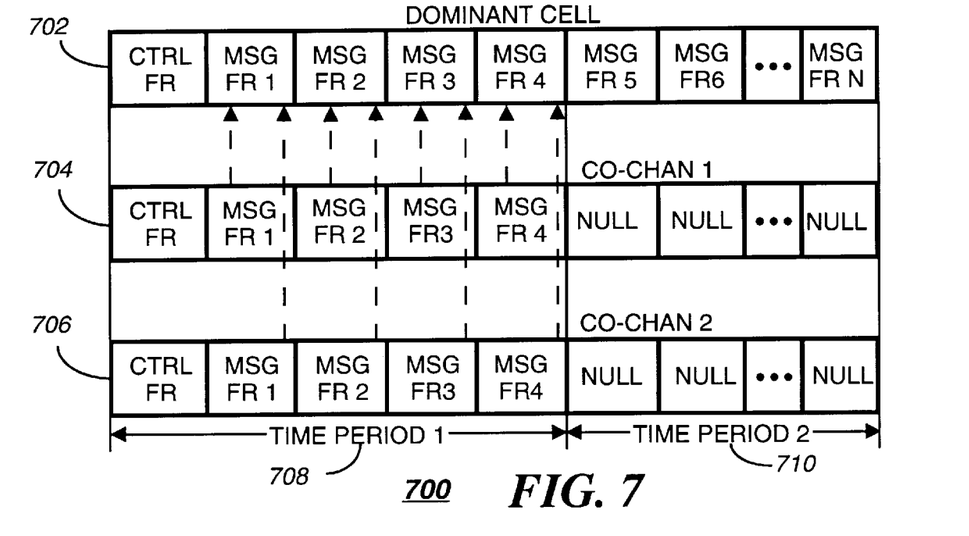
FIG. 7 is a transmission timing diagram in accordance with the present invention.

FIG. 7 is a transmission timing diagram 700 in accordance with the present invention. The diagram 700 is similar to the diagram 600, the essential difference being that in the diagram 700 the lower traffic periodic synchronous cycles 704, 706 of the non-dominant co-channel cells 502 group the active transmission frames, e.g., message frames 1–4, into four contiguous transmission frames during a first time period 708 at the beginning of the cycles 704, 706. This grouping provides a second time period 710 occurring after the end of the four contiguous transmission frames, when the non-dominant co-channel cells 502 are not transmitting any messages and thus are not generating interference in the dominant cell 504. In accordance with the present invention, the dominant cell 504 determines (as will be described below) a subset of the dominant cell messages that require a higher signal-to-interference ratio than is available in the dominant cell 504 during the first time period 708. The determined subset of the dominant cell messages is then transmitted in at least one transmission frame during the second time period 710, when interference from the non-dominant co-channel cells 502 is significantly reduced, thereby maximizing the reliability of the transmissions of the subset and improving the traffic capacity of the dominant cell.

Figure 8:
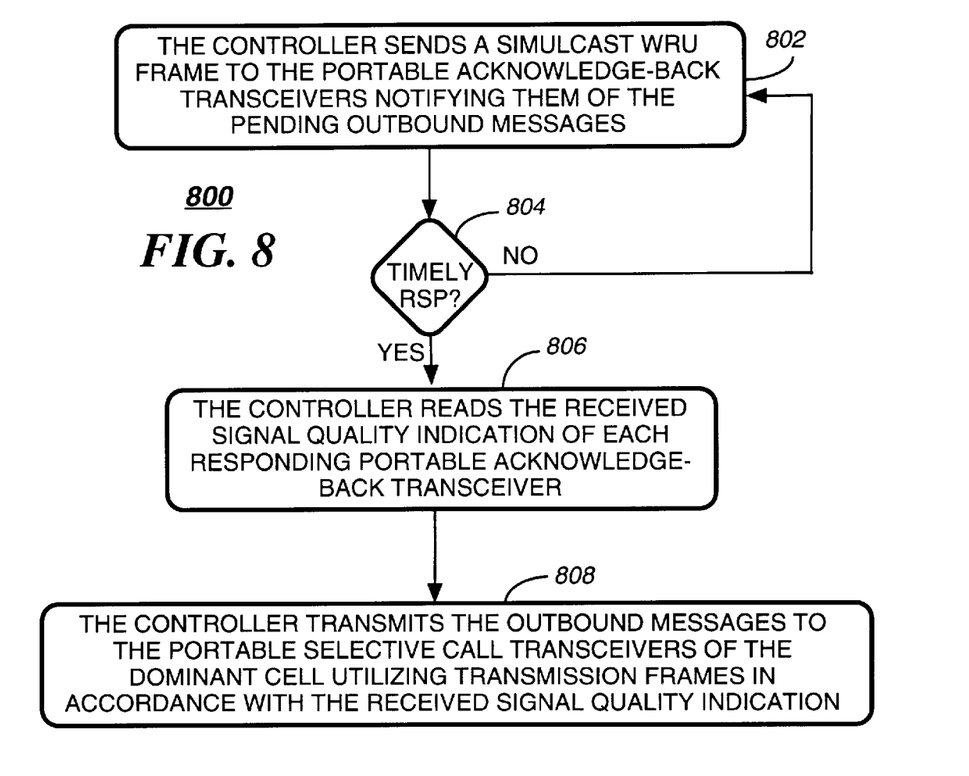
FIG. 8 depicts a flow chart of the controller operation in accordance with a first embodiment of the present invention.

FIG. 8 depicts a flow chart 800 of the operation of the controller 112 in accordance with a first embodiment of the present invention. The flow chart 800 begins with step 802 where the controller 112 is programmed to send a Where aRe yoU (WRU) "message present" announcement to the portable acknowledge-back transceivers 122 providing notification of outbound messages for the portable acknowledge-back transceivers 122. In step 804, the controller 112 waits for responses from the portable acknowledge-back transceivers 122. As timely responses from portable acknowledge-back transceivers 122 are received, the controller 112 reads and stores 806 the received signal quality indication 422 for each responding transceiver 122. Responses for transceivers 122 which are not received in a timely fashion will cause the controller 112 to generate additional WRU announcements to the non-responding transceivers 122. In step 808 the controller 112 queues 808 the outbound messages for transmission to the portable acknowledge-back transceivers 122 of the dominant cell 504 utilizing transmission frames in accordance with the received signal quality indication 422 received from each transceiver 122.

More specifically, if the received signal quality indication 422 is below a predetermined threshold, the controller queues the message for the corresponding transceiver 122 in the subset to be transmitted during the second time period 710. On the other hand, if the received signal quality indication 422 is not below the predetermined threshold, the controller queues the message for the corresponding transceiver 122 to be sent during the first time period 708. In this manner the messages for transceivers 122 reporting higher received signal quality indications 422 are advantageously sent during the higher interference first time period 708, while the messages for transceivers 122 reporting lower received signal quality indications 422 are advantageously sent during the lower interference second time period 710, thereby maximizing throughput and transmission reliability in the dominant cell 504.

Figure 9:
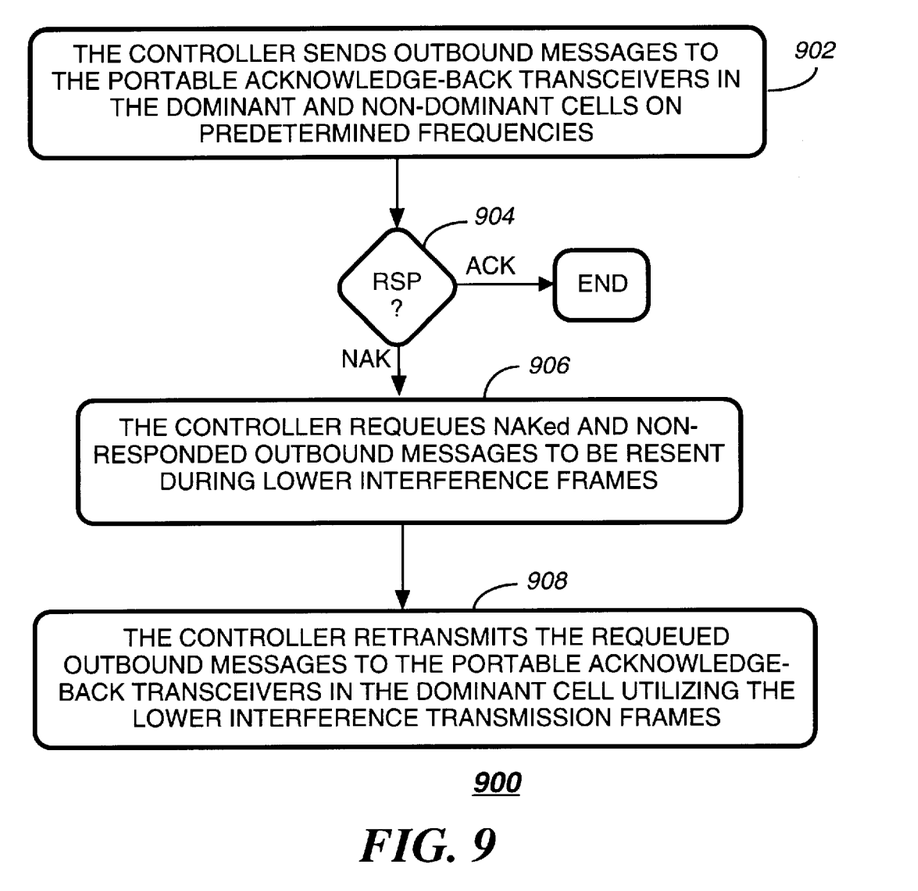
FIG. 9 depicts a flow chart of the controller operation in accordance with a second embodiment of the present invention.

FIG. 9 depicts a flow chart of the operation of the controller 112 in accordance with a second embodiment of the present invention. In this embodiment the use of transmitter color codes 421 and the calculation therefrom of the received signal quality indication 422 are not required. The flow begins with the controller 112 sending 902, preferably during the first time period 708, the outbound messages to the portable acknowledge-back transceivers 122 in the dominant and non-dominant cells on frequencies predetermined by the frequency plan of the system. In step 904 the controller 112 awaits reception of a positive or negative response from each of the portable acknowledge-back transceivers 122 sent one of the outbound messages. For those transceivers 122 in the dominant cell 504 which respond with a positive ACK, the message is considered properly received, and the process ends. For those transceivers 122 in the dominant cell 504 which respond with a NAK, or do not respond within a predetermined time, the controller 112 requeues 906 the corresponding subset of the messages for retransmission during lower interference frames, i.e., preferably during the second time period 710. Then the controller 112 retransmits 908 the requeued subset in the dominant cell, advantageously utilizing the lower interference transmission frames.

A thoughtful reader will observe that the first and second embodiments in accordance with the present invention improve the reliability of the transmissions in the dominant cell 504, while the transmission reliability in the non-dominant cells 502 is not improved, and is likely to be somewhat reduced, due to an increased probability of ones of the non-dominant cells 502 generating interference in others of the non-dominant cells 502 during the first time period 708. The transmission reliability in the dominant cell 504 is of much greater importance, however, than that of the non-dominant cell 502. This is true because the non-dominant cells 502 are by definition carrying lower traffic than the dominant cell 504. The non-dominant cells 502 thus have extra traffic capacity for any retries required to get a message through to the transceivers 122, while the dominant cell 504 may not have the extra capacity. Because the capacity of the system is determined largely by the dominant cell, it is therefore the transmission reliability of primarily the dominant cell 504 that must be maximized to reap the greatest overall system transmission reliability and traffic capacity.

Figure 10:
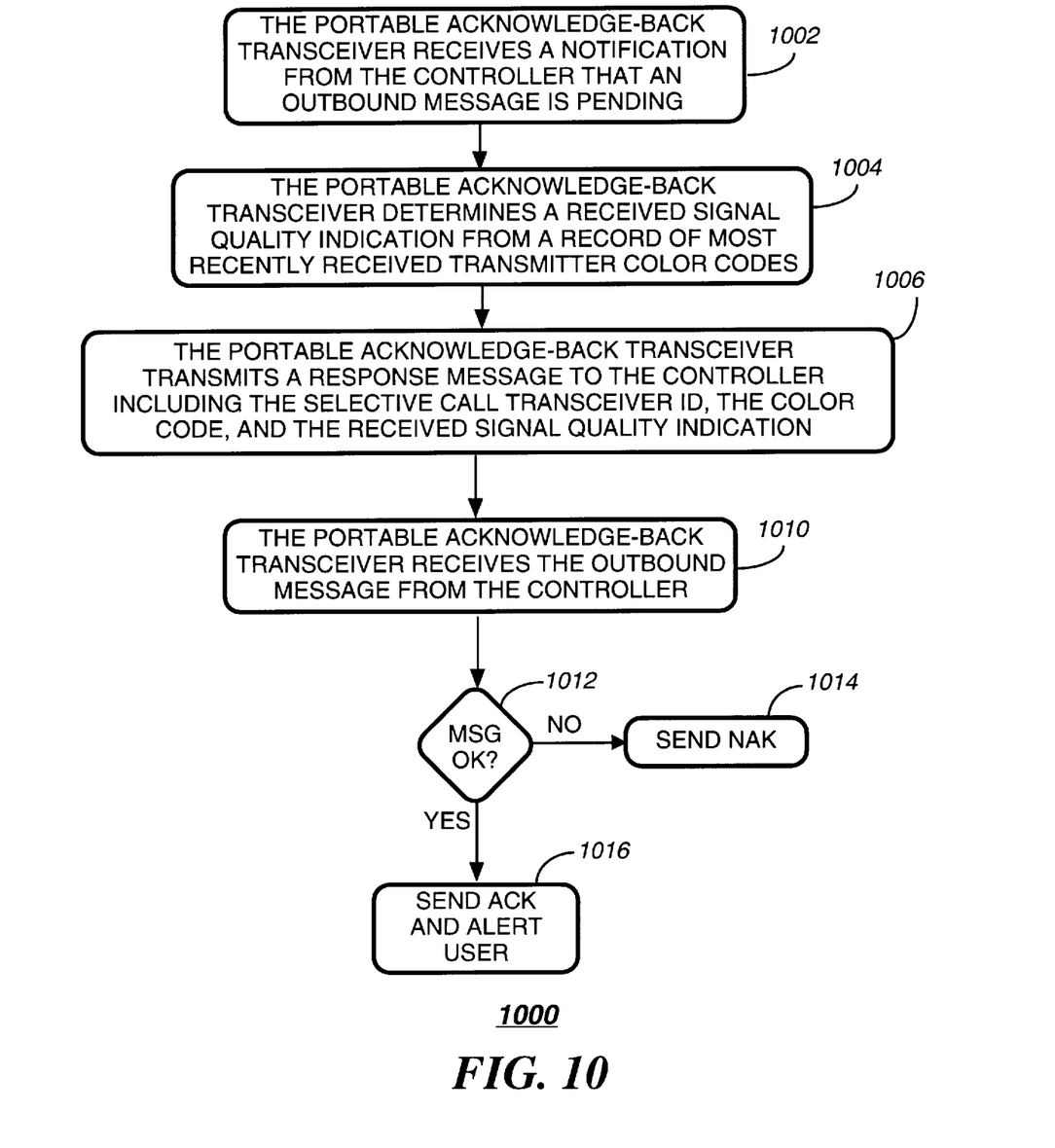
FIG. 10 depicts a flow chart of the portable acknowledge-back transceiver operation in accordance with the present invention.

FIG. 10 depicts a flow chart 1000 of the operation of the portable acknowledge-back transceiver 122 in accordance with the first and second embodiments of the present invention. The flow chart 1000 begins with step 1002, where the portable acknowledge-back transceiver 122 receives a notification from the controller 112 that an outbound message is pending. If transmitter color codes are used in the system, in step 1004 the portable acknowledge-back transceiver 122 determines from a record of most recently received transmitter color codes stored in the memory 318 the color code 421 and the received signal quality indication 422.

The step of selecting a color code to transmit back to the controller 112 comprises the steps of recording a plurality of predetermined weighting factors corresponding to each color code received and decoded, summing the plurality of predetermined weighting factors corresponding to each unique color code received, thereby forming at least one sum, and defining the cell-identifying color code to be the color code corresponding to a largest value included in the at least one sum. For example, let the weighting factors equal 1, 2, 3, 4, 5, 6, 7, and 8 in a window of eight color code receptions, and let a color code window of eight color codes received equal cc1, cc1, cc3, cc2, ccl, cc3, cc1 and cc2 (most recently received color code). The weighting factors given result in the sum cc1 equals 15, cc2 equals 12, and cc3 equals 9. Thus color code ccl having the largest sum is the color code reported to the controller 112.

The step of determining the received signal quality indication 422 comprises the steps of selecting from the record stored in the memory 318 of the portable acknowledge-back transceiver 122 a cell-identifying color code and a degree of consistency of reception of the cell-identifying color code, and computing the received signal quality indication 422 from the degree of consistency of reception. For example, a color code received with eight occurrences identifies a first predetermined value for the received signal quality indication 422, a color code received with seven occurrences identifies a second predetermined value, a color code received with five or six occurrences identifies a third predetermined value, and a color code received with four or less occurrences identifies a fourth predetermined value. Once a value for the received signal quality indication 422 is identified by the portable acknowledge-back transceiver 122, the portable acknowledge-back transceiver 122 sends 1006 a response message including the selective call receiver ID 420, the color code 421, and the received signal quality indication 422 to the controller 112.

Once the portable acknowledge-back transceiver 122 transmits the response message to the controller 112, the portable acknowledge-back transceiver 122 waits for the outbound message 408 from the controller 112. In step 1010 the portable acknowledge-back transceiver 122 receives the outbound message from the controller 112. In step 1012 the processing system 310 of the portable acknowledge-back transceiver 122 checks for errors in the message, utilizing the error detection and correction capabilities of the communication protocol. If there are too many errors for the processing system 310 to correct, the processing system 310 returns 1014 a NAK to the controller 112. If, on the other hand, the message is OK, then the processing system 310 returns 1016 an ACK to the controller 112. The portable acknowledge-back transceiver 122 then proceeds to alert the user of the received outbound message.

It will be appreciated that in systems which do not use transmitter color codes, portions of steps 1004 and 1006 associated with the color code 421 and the received signal quality indication 422 will be omitted. Alternatively, the received signal quality indication 422 can be computed in another manner, e.g., by measuring received signal strength in a manner well known in the art. In addition, it will be appreciated that the first and second embodiments in accordance with the present invention are not necessarily mutually exclusive. It is entirely reasonable, for example, to mix in a single system the operation set forth in the flow chart 800 to determine in which time period 708, 710 to send a first transmission of a message, and the operation set forth in the flow chart 900 to determine in which time period 710, 712 to send a retry of the message. It also will be appreciated that in an embodiment in which the received signal quality is determined prior to transmission of the outbound messages 408, the time periods 708, 710 can be arranged in any order, but preferably should not occur simultaneously with one another.

It will be further appreciated that, alternatively, more than the two time periods 708, 710 can be utilized. For example, the controller 112 can define three time periods corresponding to high, medium, and low interference in the dominant cell 504, and then transmit messages in a time period selected according to high, medium, and low received signal quality reported by the corresponding transceivers 122. Various other changes and modifications may reasonably occur to one of ordinary skill in the art. Accordingly, the scope of the invention is delimited only in accordance with the following claims.

It should be apparent by now that the present invention advantageously provides a novel method and apparatus for controlling transmissions to substantially reduce communication interference in a communication system utilizing frequency reuse. In particular, the present invention provides a method and apparatus for controlling transmissions in dominant and non-dominant cells of a plurality of cells utilizing a common radio frequency for sending messages. By improving the transmission reliability in the dominant cell, overall system performance and throughput are enhanced in comparison to prior art transmission techniques.

What is claimed is:

1. A method in a two-way selective call communication system for controlling transmissions in a dominant cell of a plurality of cells utilizing a common radio frequency for sending messages, the dominant cell carrying significantly greater traffic than any other cell of the plurality of cells, the method comprising the steps of:

grouping, into a first time period, the transmissions of non-dominant cell messages which interfere with the transmissions of dominant cell messages;

determining a subset of the dominant cell messages that require a higher signal-to-interference ratio than available in the dominant cell during the first time period; and transmitting the subset during a second time period different from the first time period.

2. The method of claim 1, wherein the two-way selective call communication system includes acknowledge-back transceivers, and wherein the determining step comprises the steps of:

sending a transmission of the dominant cell messages to intended acknowledge-back transceivers;

awaiting a positive response to the transmission from each of the intended acknowledge-back transceivers; and defining the subset to include the dominant cell messages for the intended acknowledge-back transceivers that do not return the positive response within a predetermined time.

3. The method of claim 1, wherein the two-way selective call communication system includes acknowledge-back transceivers, and wherein the determining step comprises the steps of:

sending a "message present" announcement to the acknowledge-back transceivers having messages to be sent;

receiving in response a received signal quality indication corresponding to responding ones of the acknowledge-back transceivers; and defining the subset to include the dominant cell messages intended for the acknowledge-back transceivers that have indicated a received signal quality below a predetermined threshold.

4. The method of claim 1, wherein the transmissions of the two-way selective call communication system occur in periodic synchronous cycles of transmission frames, and wherein the grouping step comprises the step of
sending the non-dominant cell messages during at least one contiguous transmission frame at a beginning of a periodic synchronous cycle.

5. The method of claim 4, wherein the transmitting step comprises the step of
sending the subset during at least one transmission frame that occurs after an end of the at least one contiguous transmission frame.

6. An apparatus in a two-way selective call communication system for controlling transmissions in a dominant cell of a plurality of cells utilizing a common radio frequency for sending messages, the dominant cell carrying significantly greater traffic than any other cell of the plurality of cells, the apparatus comprising:
means for grouping, into a first time period, the transmissions of non-dominant cell messages which interfere with the transmissions of dominant cell messages;
means, coupled to the means for grouping, for determining a subset of the dominant cell messages that require a higher signal-to-interference ratio than available in the dominant cell during the first time period; and
means, coupled to the means for determining, for transmitting the subset during a second time period different from the first time period.

7. The apparatus of claim 6, further comprising acknowledge-back transceivers,
wherein the means for determining comprises:
means for sending a transmission of the dominant cell messages to intended acknowledge-back transceivers;
means, coupled to the means for sending, for awaiting a positive response to the transmission from each of the intended acknowledge-back transceivers; and
means, coupled to the means for awaiting, for defining the subset to include the dominant cell messages for the intended acknowledge-back transceivers that do not return the positive response within a predetermined time.

8. The apparatus of claim 6, further comprising acknowledge-back transceivers,
wherein the means for determining comprises:
means for sending a "message present" announcement to the acknowledge-back transceivers having messages to be sent;
means, coupled to the means for sending, for receiving in response a received signal quality indication corresponding to responding ones of the acknowledge-back transceivers; and
means, coupled to the means for receiving, for defining the subset to include the dominant cell messages intended for the acknowledge-back transceivers that have indicated a received signal quality below a predetermined threshold.

9. The apparatus of claim 6,
wherein the transmissions of the two-way selective call communication system occur in periodic synchronous cycles of transmission frames, and
wherein the means for grouping comprises
means for sending the non-dominant cell messages during at least one contiguous transmission frame at a beginning of a periodic synchronous cycle.

10. The apparatus of claim 9, wherein the means for transmitting comprises
means for sending the subset during at least one transmission frame that occurs after an end of the at least one contiguous transmission frame.

11. A controller in a two-way selective call communication system for controlling transmissions in a dominant cell of a plurality of cells utilizing a common radio frequency for sending messages, the dominant cell carrying significantly greater traffic than any other cell of the plurality of cells, the controller comprising:
a telephone interface for receiving the messages from a telephone network;
a processing system coupled to the telephone interface for grouping the messages such that the transmissions of non-dominant cell messages which interfere with the transmissions of dominant cell messages are grouped into a first time period;
a receiver interface coupled to the processing system for cooperating with the processing system to determine a subset of the dominant cell messages that require a higher signal-to-interference ratio than available in the dominant cell during the first time period; and
a transmitter interface coupled to the processing system for transmitting the subset during a second time period different from the first time period.

12. The controller of claim 11,
wherein the two-way selective call communication system includes acknowledge-back transceivers, and
wherein the processing system is programmed to:
control the transmitter interface to send a transmission of the dominant cell messages to intended acknowledge-back transceivers;
await reception, via the receiver interface, of a positive response to the transmission from each of the intended acknowledge-back transceivers; and
define the subset to include the dominant cell messages for the intended acknowledge-back transceivers that do not return the positive response within a predetermined time.

13. The controller of claim 11,
wherein the two-way selective call communication system includes acknowledge-back transceivers, and
wherein the processing system is programmed to:
control the transmitter interface to send a "message present" announcement to the acknowledge-back transceivers having messages to be sent;
receive in response, via the receiver interface, a received signal quality indication corresponding to responding ones of the acknowledge-back transceivers; and
define the subset to include the dominant cell messages intended for the acknowledge-back transceivers that have indicated a received signal quality below a predetermined threshold.

14. The controller of claim 11,
wherein the transmissions of the two-way selective call communication system occur in periodic synchronous cycles of transmission frames, and
wherein the processing system is programmed to
control the transmitter interface to send the non-dominant cell messages during at least one contiguous transmission frame at a beginning of a periodic synchronous cycle.

15. The controller of claim 14, wherein the processing system is further programmed to
control the transmitter interface to send the subset during at least one transmission frame that occurs after an end of the at least one contiguous transmission frame.

* * * * *